(12) United States Patent
Jahnke

(10) Patent No.: US 6,345,517 B1
(45) Date of Patent: Feb. 12, 2002

(54) COMBINED CRYOGENIC AIR SEPARATION WITH INTEGRATED GASIFIER

(75) Inventor: Frederick C. Jahnke, Rye, NY (US)

(73) Assignee: Texaco Inc., White Plains, NY (US)

( * ) Notice: Subject to any disclaimer, the term of this patent is extended or adjusted under 35 U.S.C. 154(b) by 0 days.

(21) Appl. No.: 09/601,376
(22) PCT Filed: Feb. 3, 1999
(86) PCT No.: PCT/US99/02335
 § 371 Date: Sep. 5, 2000
 § 102(e) Date: Sep. 5, 2000
(87) PCT Pub. No.: WO99/40304
 PCT Pub. Date: Aug. 12, 1999

Related U.S. Application Data

(63) Continuation of application No. 09/241,923, filed on Feb. 2, 1999, now Pat. No. 6,134,916.
(60) Provisional application No. 60/073,686, filed on Feb. 4, 1998.

(51) Int. Cl.[7] ................................................. F25J 3/00
(52) U.S. Cl. ................................................. 62/643
(58) Field of Search .......................... 62/643, 654, 648

(56) References Cited

U.S. PATENT DOCUMENTS

| | | | | |
|---|---|---|---|---|
| 5,265,429 A | * | 11/1993 | Dray ............................ | 62/41 |
| 5,437,160 A | * | 8/1995 | Darredeau et al. ............. | 62/24 |
| 5,526,647 A | | 6/1996 | Grenier | |

* cited by examiner

Primary Examiner—Henry Bennett
Assistant Examiner—Malik N. Drake
(74) Attorney, Agent, or Firm—Morris N. Reinisch; Rodman & Rodman

(57) ABSTRACT

A combined system comprising an integrated gasifier combined cycle power generation system, an air separation unit (5) which provides oxygen to partial oxidation gasification unit gasifier (33) and an inventory section (21) which stores liquid oxygen or liquid air until it is needed.

7 Claims, 1 Drawing Sheet

COMBINED CRYOGENIC AIR SEPARATION WITH INTEGRATED GASIFIER

This application is a continuation of U.S. application Ser. No. 09/241,923 filed on Feb. 2, 1999 now U.S. Pat. No. 6,134,916 which claims the benefit of prior filed provisional Application No. 60/073,686 filed on Feb. 2, 1998.

FIELD OF THE INVENTION

The invention relates to the operation of a combined cryogenic air separation unit/integrated gasifier combined cycle power generation system and in particular to a cryogenic air separation unit capable of operating at constant capacity during periods of varying power demand for the integrated gasifier combined cycle power generation system and to a method for operating the air separation unit to vary its power consumption to maximize net integrated gasifier combined cycle power production during peak demand periods while maintaining peak efficiency when the integrated gasifier combined cycle power generation system operates at varying power production.

BACKGROUND OF THE INVENTION

The escalating costs of energy have intensified efforts to develop alternate energy sources. One result of this effort is the integrated gasifier combined cycle power plant.

The generation of electricity by integrated gasifier combined cycle power systems offers the possibility of reduced power cost and lower environmental impact than standard coal-fired power plants. In these advanced systems, coal or other carbonaceous material undergoes a partial oxidation gasification reaction with oxygen that usually has a purity of at least 80 volume % oxygen. The gas produced is cleaned to yield a low-sulfur synthetic fuel gas. This synthetic fuel gas which comprises mainly hydrogen and carbon monoxide can be utilized in a gas turbine generation system to produce electric power with reduced environmental emissions.

The increased interest in gasification combined cycle technology in recent years has been stimulated by the higher efficiency and demonstrated reliability of advanced gas turbines, coal gasification processes, and air separation systems which are utilized in the integrated gasifier combined cycle systems. The proper integration of these three main components of an integrated gasifier combined cycle system is essential to achieve maximum operating efficiency and minimum power cost.

The integrated gasifier combined cycle system is described in more detail in U.S. Pat. No. 4,328,008 to Munger et al., and U.S. Pat. No. 4,052,176 to Child et al. The disclosure of these patents is incorporated herein by reference.

Combustion-based power generation systems, including integrated gasifier combined cycle systems, are subject to periods of operation below system design capacity due to changes in demand for electric power. During these periods, such systems operate below design efficiency. The equipment selection and process design of an integrated gasifier combined cycle system therefore must address steady-state operation at design capacity as well as operation at off-design, part load, or turndown conditions.

An air- and nitrogen-integrated integrated gasifier combined cycle system is a preferred option because of the potential for operating such a system at maximum overall efficiency, particularly when the system also must operate at off-design, part load, or turndown conditions.

Because the operation of such a plant depends on consumer demand for electricity, the oxygen input to the plant often needs to vary along with the electricity demand and the reduction in power demand which occurs in the typical daily power demand cycle. For example, the nighttime power demand on a typical integrated gasifier combined cycle plant can be 50–75% of the daytime demand. Seasonal changes in power demand also may occur. During reduced power demand, the plant must be operated at part load, i.e. "turned down" by decreasing the flow of air and fuel to the gas turbine combustor.

The output variation of the integrated gasifier combined cycle system corresponds to either an increased or decreased need for products from the air separation unit which produces oxygen and nitrogen for use in the system, most importantly, the quantities of oxygen needed for the gasifier operation. Also, it is important that during increased or decreased production by the air separation unit, the purity of the products remain at or above the levels required by the gasification process.

Unfortunately, a problem is created by integrating the air separation unit with the integrated gasifier combined cycle system. Prior to the advent of the integrated gasifier combined cycle system, air separation units did not have to vary their production as severely as the operation of an integrated gasifier combined cycle requires, and they were designed accordingly. Demands typically placed on a fully integrated air separation unit are such that it must be capable of operating in the range of 50% to 100% of design capacity while responding to variations in production rate, sometimes referred to as "ramping", at about 3% of capacity per minute.

To illustrate the problem, during partial load operation or "turndown" of the air separation unit, less product is needed, yet liquids in the distillation columns flash as the air supply pressure decreases tending to generate more product. Also, the flashing liquid is oxygen rich which can potentially degrade the purity of the oxygen and nitrogen product streams.

The problem then arises as to how to control the variations in an air separation unit which may have a varying compressed feed air pressure, while meeting varying demands for oxygen and strict purity requirements.

It would be desirable for the air separation unit to have the oxygen production capacity to meet peak load requirements while not operating at sub-optimum level during off peak periods, since the efficiency of the air separation unit decreases when not operating at or near its design capacity. It would also be desirable to be able to increase power generation to super-design levels during peak periods without incurring additional costs from oversized equipment or non-optimum operating conditions.

The objective is to find a technique to permit the air separation unit to produce oxygen at an efficient level despite fluctuations in requirements resulting from the variation of demand for electricity for an integrated air separation unit, while maintaining a reasonably constant purity to satisfy the criteria of the gasifier of the integrated gasifier combined cycle power generation system.

U.S. Pat. No. 5,526,647 to Grenier, incorporated herein by reference, discloses a process for producing gaseous oxygen under pressure at a variable flow rate utilizing an liquid air storage vessel and an liquid oxygen storage vessel.

Incoming air is cooled in a heat exchanger by heat exchange with products from a distillation apparatus. Liquid oxygen is withdrawn from the distillation apparatus, brought to vaporization pressure, vaporized and reheated in the heat exchanger by incoming air which is thereby liquefied.

During a reduction in demand for gaseous oxygen under pressure relative to the nominal flow rate, excess liquid oxygen produced by the distillation apparatus is withdrawn and sent to a liquid oxygen storage vessel. A quantity of liquid air previously stored, corresponding in amount to the liquid oxygen withdrawn, is introduced into the distillation apparatus.

During an increase in demand for gaseous oxygen under pressure relative to the nominal flow rate, the required excess oxygen is withdrawn in liquid form from the liquid oxygen storage vessel, brought to vaporization pressure, and vaporized under this pressure in the heat exchanger. A corresponding quantity of air is stored which has been liquefied by such vaporization, in the liquid air storage vessel.

Disadvantages of this system include the necessity of providing two storage vessels, one for liquid air, the other for liquid oxygen, and providing lines and pumping means for transporting such liquefied gases.

Storing oxygen in the form of a gas or liquid in external tanks entails high capital costs. Storing liquid $O_2$ outside the refrigeration section or cold box of the air separation unit imposes large refrigeration costs to maintain the temperature at the proper level.

U.S. Pat. No. 5,265,429 to Dray, incorporated herein by reference, accommodates the varying load on the plant by using a product boiler to generate gaseous $O_2$ from liquid $O_2$ coupled with the use of a liquid air storage tank between the product boiler and the cryogenic rectification to solve both the loss of refrigeration caused by liquid oxygen withdrawal from and operating fluctuations in the cryogenic rectification plant.

U.S. Pat. No. 5,437,160 to Darredeau, incorporated herein by reference, relates to air separation units where the oxygen produced is used in a integrated gasifier combined cycle power system.

Darredeau proposes solving the problem of varying demand for oxygen by introducing an excess of liquid rich nitrogen into the distillation apparatus when the demand for product or the flow rate of the supplied air increases and by withdrawing an excess of liquid rich nitrogen from the distillation apparatus and storing this liquid when the demand for product or the flow rate of the supplied air decreases.

The present invention addresses the need for improved methods to operate advanced power generation systems, and in particular describes the improved operation of air- and oxygen-integrated integrated gasifier combined cycle system and air separation unit systems at various load conditions.

SUMMARY OF THE INVENTION

This invention is an integrated system which comprises an integrated gasifier combined cycle which produces power, an air separation unit which provides oxygen to the partial oxidation gasification unit gasifier and an inventory section which stores liquid oxygen or liquid air until it is needed. In a preferred embodiment, the air separation unit is designed to operate at a constant rate of oxygen production throughout the day with the excess oxygen produced being stored within the refrigeration section or cold box of the air separation unit. This avoids problems that can occur with changes in product purity associated with ramp-up and ramp-down procedures as well as allowing capital cost savings in the operation of a smaller air separation unit, since it will always be operating at or near its design capacity, and allowing reduced power consumption by the air separation unit during peak demand periods.

DESCRIPTION OF THE PREFERRED EMBODIMENTS

Figure 1:
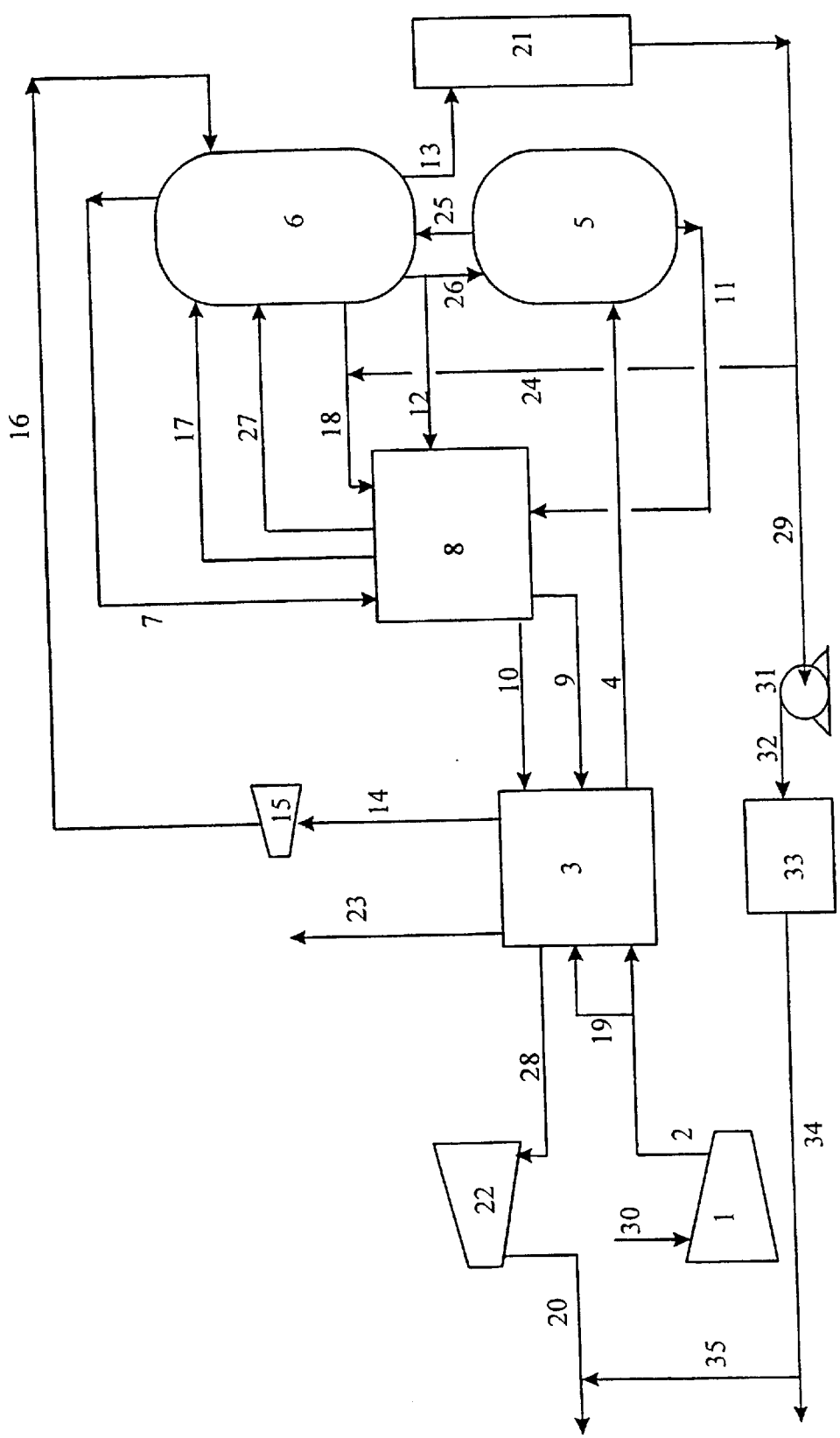
FIG. 1 is a schematic diagram of the process of the present invention.

Improvements associated with product quality and operating efficiency as well as savings in capital and operating costs can be obtained by utilizing a process where the oxygen production rate is maintained at a stable optimum level throughout the day and is not subject to significant fluctuations during changes in power plant operating conditions. The air separation unit operates at or near its capacity during periods of lower energy cost and where variations in the oxygen production rate typically required in order to match the oxygen requirements of the gasifier, sometimes referred to as "load following", can be evened out by utilizing inventoried quantities of oxygen produced during periods when the variable power cost is lowest.

The inventive process and system separate air using a cryogenic distillation system having at least one distillation column where air is separated into oxygen-rich and nitrogen-rich streams at or relatively near the air separation unit plant's design rate regardless of load conditions on the integrated gasifier combined cycle system. The process substantially maintains product purity requirements during both an increase in energy demand and feed air pressure and a decrease in product demand and feed air pressure. Problems associated with rapid incremental increases, commonly referred to as "ramp-up or ramp-down", of oxygen production are avoided.

One significant advantage of the inventive system is that it shifts energy utilization for oxygen separation and liquidation from high energy cost periods to low energy cost periods.

The air separation unit continues to produce liquid air or oxygen at an efficient rate during off-peak periods. Liquid air or oxygen not required for immediate use is stored at the bottom of a lower distillation column, increasing the liquid level in the bottom of the column, or in a separate storage vessel inside the air separation unit cold box, and held for use during peak periods when the refrigeration value of the inventoried liquid air or oxygen is recovered to increase the capacity of the air separation unit and at the same time provide additional vaporized oxygen for feed to the gasifier.

During peak periods the same or an increased amount of oxygen is fed to the gasifier while reducing or maintaining the volume of air going through the compressor to the air separation unit and supplementing oxygen output utilizing the inventoried liquid oxygen produced during low energy cost off-peak periods. This reduces the power consumed per ton of oxygen since less air must be compressed during the peak power demand period. This significantly reduces the power cost penalty generally associated with liquid oxygen production.

The inventive procedure is so flexible and effective that the required size of the air separation unit and the power demand of the air separation unit is significantly less than the standard design and operation in the case when oxygen demand varies. The shift in power demand of the air separation unit from peak to off-peak allows the net integrated gasifier combined cycle system output to vary by more than the gross output variation while running the combustion turbine and gasification units at or near optimum at all times.

Referring to FIG. 1, a feed air stream 30 from which low boiling impurities such as water vapor and carbon dioxide have been removed, is compressed in an air compressor 1. The resulting compressed air stream 2 enters main heat exchanger 3 where it is cooled, by indirect heat exchange with return streams, from ambient temperature to a temperature suitable for air separation by rectification. The cooled, compressed air leaves heat exchanger 3 through line 4 and enters the high pressure distillation column 5 of a double column distillation system.

In the high pressure distillation column 5 the cooled, compressed air is fractionated into a high pressure nitrogen vapor overhead 25 and oxygen-enriched bottoms liquid 11. The high pressure nitrogen vapor 25 enters the bottom of the low pressure distillation column 6 where it is condensed by indirect heat exchange with boiling liquid oxygen introduced to column 6 through line 27. A portion 26 of the condensed liquid nitrogen exits the bottom of distillation column 6 and is returned as pure reflux to the high pressure distillation column 5. A second portion 12 of the liquid nitrogen is separated from condensed liquid nitrogen 26 and enters heat exchanger 8, and where it is subcooled and introduced to column 6 via line 17.

Low pressure gaseous nitrogen overhead 7, generally at a pressure within the range of 60 to 90 pounds per square inch absolute, exits low is pressure distillation column 6 and is recycled through heat exchanger 8, exiting via line 9 after partial heating and entering heat exchanger 3. The refrigeration values of nitrogen stream 7 are recaptured by heat exchangers 8 and 3. The nitrogen stream exits heat exchanger 3 through line 23 where it is vented or optionally transferred to the combustion turbine of the integrated gasifier combined cycle system (not shown).

The oxygen enriched bottoms liquid 11 exiting column 5 enters heat exchanger 8 where it is cooled and the exit stream 27 is fed to an intermediate location of column 6 for further distillation and purification.

A portion 19 of the feed air leaving compressor 1 is divided from line 2 and fed, optionally after passing through a booster compressor (not shown), to heat exchanger 3. After cooling in heat exchanger 3 the air stream 14 exits the heat exchanger and enters expander 15 where it is expanded, cooled and introduced via line 16 into an intermediate location of column 6 to provide refrigeration and to separate the components via distillation.

The condensed nitrogen reflux 17 and the reduced pressure oxygen enriched bottoms liquid 27 are distilled in column 6 to produce a gaseous nitrogen stream 7 that exits overhead. A liquid oxygen stream exits column 6 via line 18. Excess liquid oxygen may be stored in the bottom of the low pressure distillation column 6. Optionally, liquid oxygen from low pressure distillation column 6 is transferred through line 13 to vessel 21 and is stored in liquid oxygen storage vessel 21 until such time as it is needed during periods of high power demand on the integrated gasifier combined cycle system. When needed, the liquid oxygen is recycled from storage vessel 21 through line 24 and combined with liquid oxygen stream 18 entering heat exchanger 8.

Optionally, liquid oxygen from storage vessel 21 is transferred through line 29 to liquid oxygen pump 31 where it is pressurized and flows through line 32 to vaporizer 33 where it is vaporized in to provide a high pressure oxygen product without expending the power required for compression. The high pressure gaseous oxygen exiting vaporizer 33 through line 34 may be combined via line 35 with oxygen product stream 20 exiting compressor 22.

Storage receptacle 21 is placed within the cold box of the air separation unit, thus maintaining the oxygen in liquid state with little energy expenditure. In a preferred embodiment, the excess liquid oxygen produced can be stored in the bottom of the low pressure distillation column.

Gaseous oxygen 18 exits column 6 and enters heat exchanger 8, exiting as stream 10 which enters heat exchanger 3 and exits via line 28. The oxygen is then compressed in compressor 22 and exits as high pressure gaseous oxygen 20.

During periods of peak demand, the flow in certain lines may increase. As an example, the flow of compressed air in line 2 may increase from a normal flow of about 100% to about 105% and the flow of liquid oxygen in line 18 from about 100% to about 115%. Conversely, at off peak times, the flow in certain lines may decrease. The flow of compressed air in line 2 may decrease from a normal flow of about 100% to about 95% and that of liquid oxygen in line 18 from about 100% to about 85%.

It is preferable to maintain the flow of air entering the system through line 2 at a constant level to avoid any concerns with ramp-up or ramp-down of the system or of variations in product quality that may result from changes in the input flow. The system is sufficiently flexible that changes in the input flow do not cause significant fluctuations in the system efficiency.

EXAMPLE 1

In this example, various energy consumptions are calculated to determine the differences in energy consumption utilizing the constant operation air separation unit as described above. The results demonstrate that 2 megawatts (MW) of additional net power output are obtained using the disclosed integrated system. This also demonstrates that an equivalent net power output can be obtained from a smaller air separation unit with associated lower capital costs when oxygen demand varies.

|  | 100% Capacity (peak) (MW) | | 75% Capacity (off-peak) (MW) | |
| --- | --- | --- | --- | --- |
|  | without Load Following | with Load Following | without Load Following | with Load Following |
| Typical Turbine Output (Gross) | 303 | 303 | 227.25 | 233.31 |
| Typical air separation unit Power Demand | 35 | 33 | 26.25 | 28.86 |
| Air | 17 | 15 | 12.75 | 15 |
| Oxygen | 9 | 9 | 6.75 | 6.93 |
| Nitrogen | 9 | 9 | 6.75 | 6.93 |
| Net Power Output | 268 | 270 | 201.00 | 204.45 |

What is claimed is:

1. A method for operating an air separation unit to produce liquid oxygen from incoming air at a constant rate of production and purity despite variations in oxygen demand, wherein said air separation unit comprises cryogenic distillation means and refrigeration means and wherein the excess liquid oxygen is stored within the refrigeration means and distributed as needed by vaporizing the liquid oxygen in indirect heat exchange with the incoming air.

2. The method of claim 1, wherein the output of the air separation unit is linked to a combustion turbine.

3. The method of claim 1, wherein the output of the air is linked to a partial oxidation gasification system.

4. The method of claim 1, wherein the air separation unit comprises a high-pressure distillation column and a low-pressure distillation column.

5. The method of claim 1, wherein the refrigeration means exist at the bottom of the low-pressure distillation column of the air separation unit.

6. The method of claim 1 wherein the excess liquid oxygen is stored in the bottom of the low-pressure distillation column of the air separation unit.

7. A method for operating an air separation unit to produce liquid oxygen from incoming air at a constant rate of production and purity despite variations in oxygen demand, wherein said air separation unit comprises cryogenic distillation means, refrigeration means, a high-pressure distillation column and a low-pressure distillation column, and wherein the excess liquid oxygen is stored in contact with refrigeration means in the low-pressure distillation column and distributed as needed by vaporizing the liquid oxygen in indirect heat exchange with the incoming air.

* * * * *